United States Patent
Shen et al.

(10) Patent No.: US 10,872,332 B2
(45) Date of Patent: Dec. 22, 2020

(54) VIRTUAL CARD OPENING METHOD AND SYSTEM, PAYMENT SYSTEM, AND CARD ISSUING SYSTEM

(71) Applicant: ADVANCED NEW TECHNOLOGIES CO., LTD., Grand Cayman (KY)

(72) Inventors: Lingnan Shen, Hangzhou (CN); Jie Qi, Hangzhou (CN); Ge Chen, Hangzhou (CN); Huifeng Jin, Hangzhou (CN); Huanming Sun, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/736,714

(22) Filed: Jan. 7, 2020

(65) Prior Publication Data

US 2020/0143361 A1    May 7, 2020

Related U.S. Application Data (63) Continuation of application No. PCT/CN2018/107254, filed on Sep. 25, 2018.

(30) Foreign Application Priority Data

Sep. 27, 2017 (CN) .......................... 2017 1 0888039

(51) Int. Cl.
*G06Q 40/02* (2012.01)
*G06Q 20/34* (2012.01)
(Continued)

(52) U.S. Cl.
CPC ....... *G06Q 20/351* (2013.01); *G06F 16/9558* (2019.01); *G06Q 20/349* (2013.01);
(Continued)

(58) Field of Classification Search
CPC .... G06Q 20/351; G06Q 20/405; G06Q 40/02; G06Q 20/349; G06Q 20/354; G06F 16/9558
See application file for complete search history.

(56) References Cited

U.S. PATENT DOCUMENTS 7,908,216 B1 * 3/2011 Davis ..................... G06Q 20/02
                                                                705/41
8,892,474 B1   11/2014 Inskeep et al.
(Continued)

FOREIGN PATENT DOCUMENTS

CN   101883143 A   11/2010
CN   102521757 A    6/2012
(Continued)

OTHER PUBLICATIONS

PYMNTS: WEX Selected to Issue GraspPAY Virtual Credit Card, Sep. 30, 2015, Merchant Innovation, pp. 1-4 (Year: 2015).*

(Continued)

*Primary Examiner* — Bijendra K Shrestha (57) ABSTRACT

A virtual card opening method and system, a payment system, and a card issuing system are disclosed. The method comprises: receiving, through an online traffic entrance associated with a payment system, a virtual card opening request from a user, the virtual card opening request comprising user information and type identifier information of a virtual card; searching, by the payment system, for a rule for acting as an agent to open a card and a card opening condition corresponding to the type identifier information from the payment system, the rule for acting as an agent to open a card and the card opening condition being obtained in advance by the payment system from a card issuing system; and generating, by the payment system, a target virtual card according to the user information and the rule for acting as an agent.

20 Claims, 7 Drawing Sheets

(51) Int. Cl.
  *G06F 16/955* (2019.01)
  *G06Q 20/40* (2012.01)
(52) U.S. Cl.
  CPC ......... *G06Q 20/354* (2013.01); *G06Q 20/405* (2013.01); *G06Q 40/02* (2013.01)

(56) References Cited

U.S. PATENT DOCUMENTS

| | | |
|---|---|---|
| 9,223,965 B2 | 12/2015 | Boivie et al. |
| 9,264,425 B1 | 2/2016 | Chen |
| 9,602,507 B1 | 3/2017 | Wieland |
| 9,710,804 B2 * | 7/2017 | Zhou ............... G06Q 20/3829 |
| 10,475,026 B2 | 11/2019 | Friedlander et al. |
| 10,540,835 B2 * | 1/2020 | Kuenzi ............ G07C 9/00571 |
| 2002/0088852 A1 | 7/2002 | Ohta et al. |
| 2002/0095387 A1 * | 7/2002 | Sosa ........................ G06Q 20/26 705/65 |
| 2003/0145205 A1 * | 7/2003 | Sarcanin ............ G06Q 20/3823 713/172 |
| 2010/0082487 A1 * | 4/2010 | Nelsen .................... G06Q 30/02 705/44 |
| 2011/0282784 A1 | 11/2011 | Nelsen |
| 2012/0191517 A1 | 7/2012 | Daffin, Jr. et al. |
| 2012/0271692 A1 * | 10/2012 | Huang .................... G06O 30/06 705/14.23 |
| 2014/0019352 A1 * | 1/2014 | Shrivastava ........... G06Q 20/36 705/41 |
| 2014/0058855 A1 * | 2/2014 | Hussein ................ G06Q 20/20 705/16 |
| 2014/0249904 A1 * | 9/2014 | Nelsen .................... G06Q 20/10 705/14.23 |
| 2015/0088753 A1 | 3/2015 | Van Der |
| 2015/0186872 A1 | 7/2015 | Sobol et al. |
| 2015/0262291 A1 | 9/2015 | West et al. |
| 2016/0275485 A1 | 9/2016 | Liu et al. |
| 2017/0076277 A1 | 3/2017 | Zhou et al. |
| 2017/0372298 A1 | 12/2017 | Zhu et al. |
| 2018/0367983 A1 | 12/2018 | Lou et al. |
| 2019/0325429 A1 | 10/2019 | Huang et al. |

FOREIGN PATENT DOCUMENTS

| | | | |
|---|---|---|---|
| CN | 105139252 A | 12/2015 | |
| CN | 105631496 A | 6/2016 | |
| CN | 106529938 A | 3/2017 | |
| CN | 106713248 A | 5/2017 | |
| CN | 106991575 A | 7/2017 | |
| CN | 107748989 A | 3/2018 | |
| EP | 0814440 A1 * | 12/1997 | ........... G06Q 20/342 |
| TW | I522841 B | 2/2016 | |
| WO | WO-2016127407 A1 * | 8/2016 | ............. G06Q 20/38 |
| WO | WO-2019022963 A1 * | 1/2019 | ........... G06Q 20/385 |

OTHER PUBLICATIONS

Goodman, A.: New Virtual Credit Cards for Businesses Eliminating The Need for Checks, Mar. 7, 2017, Investing, pp. 1-5 (Year: 2017).*
Payment Technology Forum: Virtual Payment Cards: A Handbook for Hoteliers, Sep. 2015, HEDNA, htng, pp. 1-14 (Year: 2015).*
Written Opinion of the International Searching Authority and International Search Report for PCT Application No. PCT/CN2018/107254 dated Jan. 3, 2019 with partial English translation (11 pages).
Search Report for European Application No. 18860063.9 dated Apr. 22, 2020.
Examination Report for European Application No. 18860063.9 dated Jun. 5, 2020.
International Preliminary Report on Patentability Chapter I for PCT Application No. PCT/CN2018/107254 dated Apr. 9, 2020.
First Search for Chinese Application No. 201710888039.5 dated Feb. 28, 2020.
First Office Action for Chinese Application No. 201710888039.5 dated Mar. 9, 2020.
Supplementary Search for Chinese Application No. 201710888039.5 dated Jul. 22, 2020.

* cited by examiner

VIRTUAL CARD OPENING METHOD AND SYSTEM, PAYMENT SYSTEM, AND CARD ISSUING SYSTEM

CROSS REFERENCE TO RELATED APPLICATION

The present application is a continuation application of International Patent Application No. PCT/CN2018/107254, filed on Sep. 25, 2018, which claims priority to Chinese Patent Application No. 201710888039.5, filed on Sep. 27, 2017. The entire content of the above referenced applications are incorporated herein by reference.

TECHNICAL FIELD

This application relates to the field of computer technologies, and in particular, to a virtual card opening method and system, a payment system, and a card issuing system.

BACKGROUND

With the application and promotion of virtual card products such as a virtual electronic public transportation card and a virtual electronic membership card, more and more merchants issue virtual cards in a third-party payment system, so that a user can receive, through the third-party payment system, a virtual card issued by a merchant, and thus can shop in an offline store by using the virtual card received in the third-party payment system. When the user receives, through the third-party payment system, the virtual card issued by the merchant, it relies on a data processing capability of the merchant's system. A third-party payment system with a strong traffic diversion capability may bring heavy user traffic to the merchant system, which may cause a delay when the merchant system feeds back a virtual card to the user.

SUMMARY

Embodiments disclosed in this specification provide a virtual card opening method and system, a payment system, and a card issuing system, to effectively improve virtual card opening efficiency for a user while reducing the traffic pressure of the card issuing system.

An embodiment disclosed in this specification provides a virtual card opening method, including:
  receiving, through an online traffic entrance associated with a payment system, a virtual card opening request from a user, the virtual card opening request comprising user information of the user and type identifier information of a virtual card requested by the user;
  searching, by the payment system, for a rule for acting as an agent to open a card and a card opening condition corresponding to the type identifier information from the payment system, the rule for acting as an agent to open a card and the card opening condition being obtained in advance by the payment system from a card issuing system corresponding to the type identifier information and being stored in the payment system; and
  generating, by the payment system, a target virtual card according to the user information and the rule for acting as an agent to open a card when the card opening condition is satisfied.
  In some embodiments, the online traffic entrance comprises a hyperlink.

In some embodiments, the method further includes:
  storing, by the payment system, information of the target virtual card in the payment system.
  In some embodiments, the method further includes:
  asynchronously sending, by the payment system, the information of the target virtual card stored in the payment system to the card issuing system according to the rule for acting as an agent to open a card.
  In some embodiments, the asynchronously sending, by the payment system, the information of the target virtual card stored in the payment system to the card issuing system according to the rule for acting as an agent to open a card comprises:
  sending, by the payment system, the information of the target virtual card stored in the payment system to the card issuing system according to a preset time interval.
  In some embodiments, the asynchronously sending, by the payment system, the information of the target virtual card stored in the payment system to the card issuing system according to the rule for acting as an agent to open a card comprises:
  sending, by the payment system, the information of the target virtual card stored in the payment system to the card issuing system after the payment system receives a target virtual card using request from the user.
  In some embodiments, the payment system receives the target virtual card using request from the user through a user end.
  In some embodiments, the payment system performs a recharging operation on the target virtual card.

An embodiment disclosed in this specification further provides a payment system for virtual card opening, comprising a processor and a non-transitory computer-readable storage medium storing instructions executable by the processor to cause the system to perform operations comprising: receiving a virtual card opening request from a user through an online traffic entrance associated with the payment system, the virtual card opening request comprising user information of the user and type identifier information of a virtual card requested by the user; searching for a rule for acting as an agent to open a card and a card opening condition corresponding to the type identifier information from the payment system, the rule for acting as an agent to open a card and the card opening condition being obtained in advance by the payment system from a card issuing system corresponding to the type identifier information and being stored in the payment system; and generating a target virtual card according to the user information and the rule for acting as an agent to open a card when the card opening condition is satisfied.

Another embodiment disclosed in this specification further provides a non-transitory computer-readable storage medium for virtual card opening, configured with instructions executable by one or more processors to cause the one or more processors to perform operations comprising: receiving, through an online traffic entrance associated with a payment system, a virtual card opening request from a user, the virtual card opening request comprising user information of the user and type identifier information of a virtual card requested by the user; searching, by the payment system, for a rule for acting as an agent to open a card and a card opening condition corresponding to the type identifier information from the payment system, the rule for acting as an agent to open a card and the card opening condition being obtained in advance by the payment system from a card issuing system corresponding to the type identifier information and being stored in the payment system; and generating, by the payment system, a target virtual card according to the user information and the rule for acting as an agent to open a card when the card opening condition is satisfied.

BRIEF DESCRIPTION OF THE DRAWINGS

The accompanying drawings described herein are used for providing further understanding of this specification. Schematic embodiments disclosed in this specification are used for illustration purpose, but do not limit the scope of this specification.

DETAILED DESCRIPTION

Figure 1:
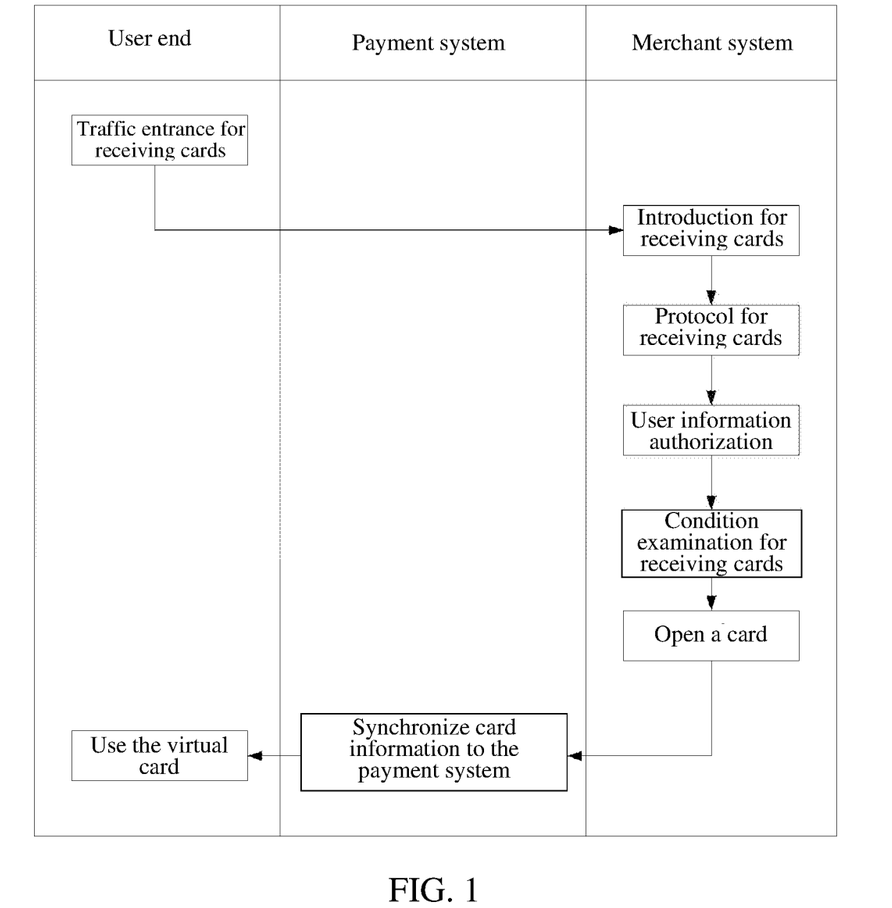
FIG. 1 is a schematic diagram of a virtual card opening method in the existing technology.

FIG. 1 is a schematic diagram of a virtual card opening method in the existing technology.

As shown in FIG. 1, a user sends a virtual card opening request to a payment system through a traffic entrance for receiving virtual cards on the user end. According to the virtual card opening request, the payment system redirects the user to a card opening page provided by a merchant system. The user reads an introduction for receiving virtual cards and agrees to a protocol for receiving virtual cards on the card opening page, and provides the merchant system with user information required for opening the virtual card. When determining that the user meets conditions for receiving the virtual card, the merchant system generates, according to the user information, a target virtual card applied by the user. The merchant system stores information of the target virtual card, and synchronously sends the information of the target virtual card to the payment system, so that the user receives the virtual card. The user can view the target virtual card received in the payment system on the user end, and thus can use, on the user end, the target virtual card received in the payment system when shopping in an offline store.

However, when the user receives the virtual card in the payment system, the payment system needs to interact with the merchant system in real time. When the payment system has a strong traffic diversion capability, the payment system may bring heavy user traffic to the merchant system in a short period of time. Because of the high traffic load, a delay may be caused when the merchant system sends the virtual card to the payment system. On one hand, the waiting time to receive the virtual card may be increased, which may lead to a poor user experience. On the other hand, the heavy traffic load may also increase the establishment and maintenance costs of the merchant system.

Some embodiments disclosed in this specification provide a virtual card opening method and system, a payment system, and a card issuing system. The method includes: obtaining, by a payment system, a rule for acting as an agent to open a card and a card opening condition from a card issuing system in advance, so that when the payment system receives a virtual card opening request from a user and a card opening condition is satisfied, the payment system generates, according to the rule for acting as an agent to open a card and user information in the virtual card opening request, a target virtual card requested by the user. The rule for acting as an agent to open a card may include one or more rules for the payment system to act as an agent for opening virtual cards for the card issuing system. Therefore, when the user receives the virtual card in the payment system, real-time interaction between the payment system and the card issuing system is avoided, thus effectively improving virtual card opening efficiency of the user.

After receiving a request for acting as an agent to open a card from the payment system, the card issuing system sends the rule for acting as an agent to open a card and the card opening condition to the payment system, so that when the card opening condition is satisfied, the payment system can generate the target virtual card for the user according to the rule for acting as an agent to open a card. Therefore, virtual card opening is decoupled from the card issuing system under the condition that the user receives the virtual card in time, which effectively reduces the traffic load of the card issuing system.

Embodiments will be described in detail, with examples shown in the accompanying drawings. When the description below involves the accompanying drawings, unless otherwise indicated, the same numeral in different accompanying drawings stands for the same element or similar elements. The implementation manners described in the following embodiments do not represent all the implementation manners consistent with the specification. Rather, they are examples of the apparatuses and methods described in detail in the attached claims and consistent with some aspects of one or more embodiments of the specification.

Figure 2:
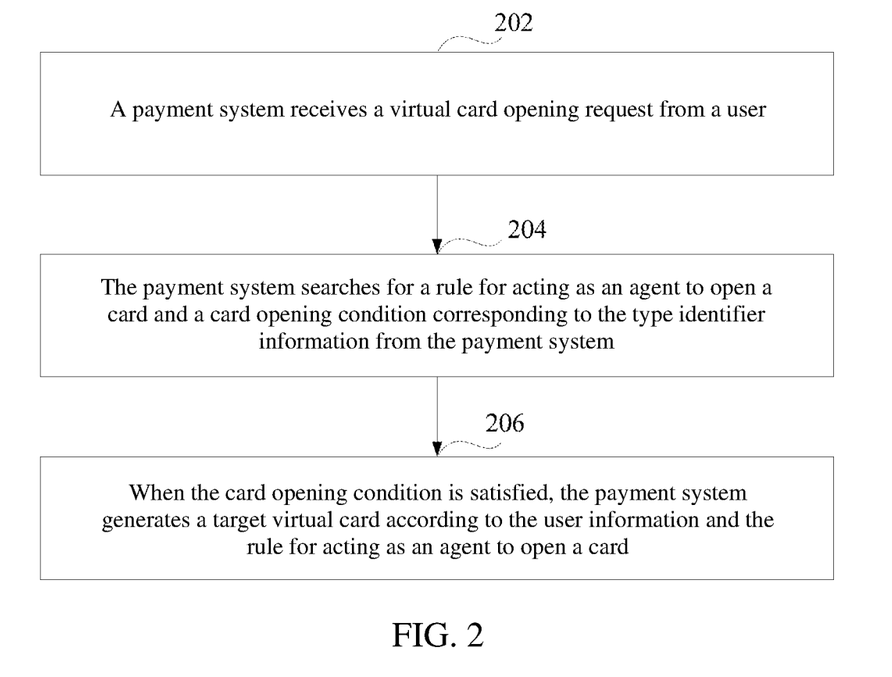
FIG. 2 is a schematic flowchart of a virtual card opening method according to an embodiment.

FIG. 2 is a schematic flowchart of a virtual card opening method according to an embodiment. The method may be shown as follows:

Step 202: A payment system receives a virtual card opening request from a user.

The virtual card opening request includes user information of the user and type identifier information of a virtual card requested by the user.

The user is redirected to a virtual card receiving page of the payment system through a traffic entrance for receiving virtual cards in a user end. After determining the user information that is provided by the user and required for receiving the virtual card and determining the type identifier information of the virtual card requested by the user, the user end generates a virtual card opening request including the user information and the type identifier information of the virtual card, and sends the virtual card opening request to the payment system.

The traffic entrance for receiving virtual cards in the user end may be a virtual card advertisement hyperlink, a virtual card introduction in the user end, or another form of traffic entrance for receiving virtual cards, which is not limited herein.

The type identifier information of the virtual card may include identity information for identifying an issuer of the virtual card. For example, if the type identifier information is merchant A, it indicates that the virtual card requested by the user is a virtual card provided by the merchant A.

Step 204: The payment system searches for a rule for acting as an agent to open a card and a card opening condition corresponding to the type identifier information within the payment system according to the type identifier information.

The rule for acting as an agent to open a card and the card opening condition are obtained in advance by the payment system from a card issuing system corresponding to the type identifier information and are stored in the payment system.

The payment system sends a request for acting as an agent to open a card to the card issuing system in advance. After agreeing to the request for acting as an agent to open a card from the payment system, the card issuing system feeds back the rule for acting as an agent to open a card and the card opening condition to the payment system. The payment system receives the rule for acting as an agent to open a card and the card opening condition, and stores the rule for acting as an agent to open a card and the card opening condition in the payment system.

The rule for acting as an agent to open a card represents a card opening rule agreed upon by the payment system and the card issuing system. The card opening condition may include an introduction, a protocol, and a condition for receiving a virtual card, and may further include other card opening conditions according to actual situations, which are not limited herein.

In some embodiments, the payment system can receive rule for acting as an agent to open a card and card opening conditions sent by different card issuing systems. For ease of distinguishing, in the payment system, a mapping relationship of a rule for acting as an agent to open a card and a card opening condition with the type identifier information of a virtual card that can be provided by a card issuing system may be established. For example, if type identifier information of a virtual card mapped to a rule for acting as an agent to open a card and a card opening condition is merchant A, it indicates that the rule for acting as an agent to open a card and the card opening condition correspond to a virtual card that can be provided by the merchant A.

After receiving the virtual card opening request from the user through the user end, the payment system searches for a rule for acting as an agent to open a card and a card opening condition corresponding to the type identifier information within the payment system according to the type identifier information in the virtual card opening request.

Step 206: When the card opening condition is satisfied, the payment system may generate a target virtual card according to the user information and the rule for acting as an agent to open a card.

The payment system may push the introduction and the protocol for receiving a virtual card included in the card opening condition to the user end, so that the user can view the introduction and the protocol for receiving the virtual card.

After the payment system receives an instruction, from the user through the user end, of agreeing on the protocol for receiving the virtual card, the payment system may complete examination of the condition for receiving the virtual card according to the user information in the virtual card opening request. After determining that the condition is satisfied, the payment system may generate a target virtual card requested by the user according to the rule for acting as an agent to open a card, and complete the operation of opening a card as an agent.

In some embodiments, the method may further include:

The payment system stores information of the target virtual card in the payment system.

After the payment system completes the operation of opening a card as an agent and generates the target virtual card requested by the user, the payment system may store the target virtual card in the payment system, so that the user can use, through the payment system, the target virtual card to shop in an offline store subsequently.

In some embodiments, the method may further include:

The payment system performs a recharging operation on the target virtual card.

After the payment system completes the operation of opening a card as an agent and generates the target virtual card requested by the user, the payment system may add credits to the target virtual card, so that the user can use, through the payment system, the balance in the target virtual card to shop in an offline store subsequently.

In some embodiments, the method may further include:

The payment system asynchronously sends the information of the target virtual card stored in the payment system to the card issuing system according to the rule for acting as an agent to open a card.

In some embodiments, the information of the target virtual card stored in the payment system needs to be sent to the card issuing system according to the rule for acting as an agent to open a card. To reduce the traffic pressure of the card issuing system, the payment system may asynchronously send the information of the target virtual card to the card issuing system according to the rule for acting as an agent to open a card.

The payment system may asynchronously send the information of the target virtual card stored in the payment system to the card issuing system according to the rule for acting as an agent to open a card in the following two manners:

In the first manner, the payment system asynchronously sends the information of the target virtual card stored in the payment system to the card issuing system according to a preset time interval.

For example, the payment system sends the information of the target virtual card in a T+1 manner. That is, after a 24-hour time interval since creating of a target virtual card, information of the newly generated target virtual card is sent to the card issuing system.

In the second manner, after receiving a target virtual card using request from the user, the payment system sends the information of the target virtual card stored in the payment system to the card issuing system.

After the target virtual card is generated, the information of the target virtual card stored in the payment system is sent to the card issuing system only after the target virtual card using request from the user is received, thus effectively reducing the traffic pressure and the system capacity pressure of the card issuing system.

In some embodiments, the payment system receives the target virtual card using request from the user through the user end.

When using the target virtual card in the user end, the user sends the target virtual card using request to the payment system through the user end, so that the payment system can process, according to the virtual card using request, that the user's use of the target virtual card in the user end to shop in an offline store.

In some embodiments, a payment system obtains a rule for acting as an agent to open a card and a card opening condition from a card issuing system in advance, so that when the payment system receives a virtual card opening request from a user and a card opening condition is satisfied, the payment system generates, according to the rule for acting as an agent to open a card and user information in the virtual card opening request, a target virtual card requested by the user. Therefore, when the user receives the virtual card in the payment system, real-time interaction between the payment system and the card issuing system is avoided, thus effectively improving virtual card opening efficiency for the user.

Figure 3:
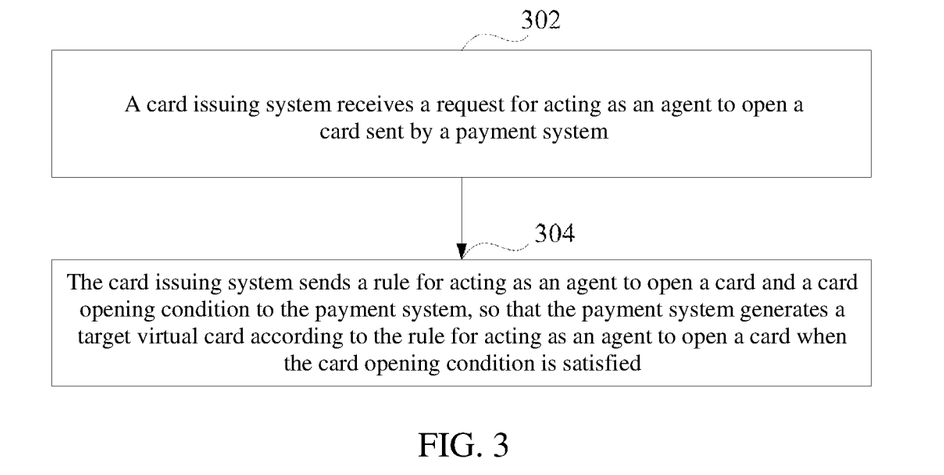
FIG. 3 is a schematic flowchart of a virtual card opening method according to an embodiment.

FIG. 3 is a schematic flowchart of a virtual card opening method according to an embodiment. The method may be shown as follows:

Step 302: A card issuing system receives a request for acting as an agent to open a card sent by a payment system.

The payment system sends the request for acting as an agent to open a card to the card issuing system, and the payment system opens the virtual card for the user in substitution of the card issuing system.

Step 304: The card issuing system sends a rule for acting as an agent to open a card and a card opening condition to the payment system, so that the payment system generates a target virtual card according to the rule for acting as an agent to open a card when the card opening condition is satisfied.

The card issuing system feeds back the rule for acting as an agent to open a card and the card opening condition to the payment system after agreeing on request for acting as an agent to open a card from the payment system. The payment system receives the rule for acting as an agent to open a card and the card opening condition, and stores the rule for acting as an agent to open a card and the card opening condition in the payment system.

The rule for acting as an agent to open a card represents a card opening rule agreed upon by the payment system and the card issuing system. The card opening condition may include an introduction, a protocol, and a condition for receiving a virtual card, and may further include other card opening conditions according to actual situations, which are not limited herein.

In some embodiments, the method may further include:

The card issuing system receives information of a newly generated target virtual card sent by the payment system.

According to the rule for acting as an agent to open a card, the payment system asynchronously sends the information of the newly generated target virtual card in the payment system to the card issuing system, and the card issuing system receives the information of the newly generated target virtual card sent by the payment system.

In some embodiments, a card issuing system sends a rule for acting as an agent to open a card and a card opening condition to a payment system after receiving a request for acting as an agent to open a card from the payment system, so that when the card opening condition is satisfied, the payment system can generate a target virtual card for the user according to the rule for acting as an agent to open a card. Therefore, virtual card opening is decoupled from the card issuing system under the condition that the user receives the virtual card in time, which effectively reduces the traffic load of the card issuing system.

Figure 4A:
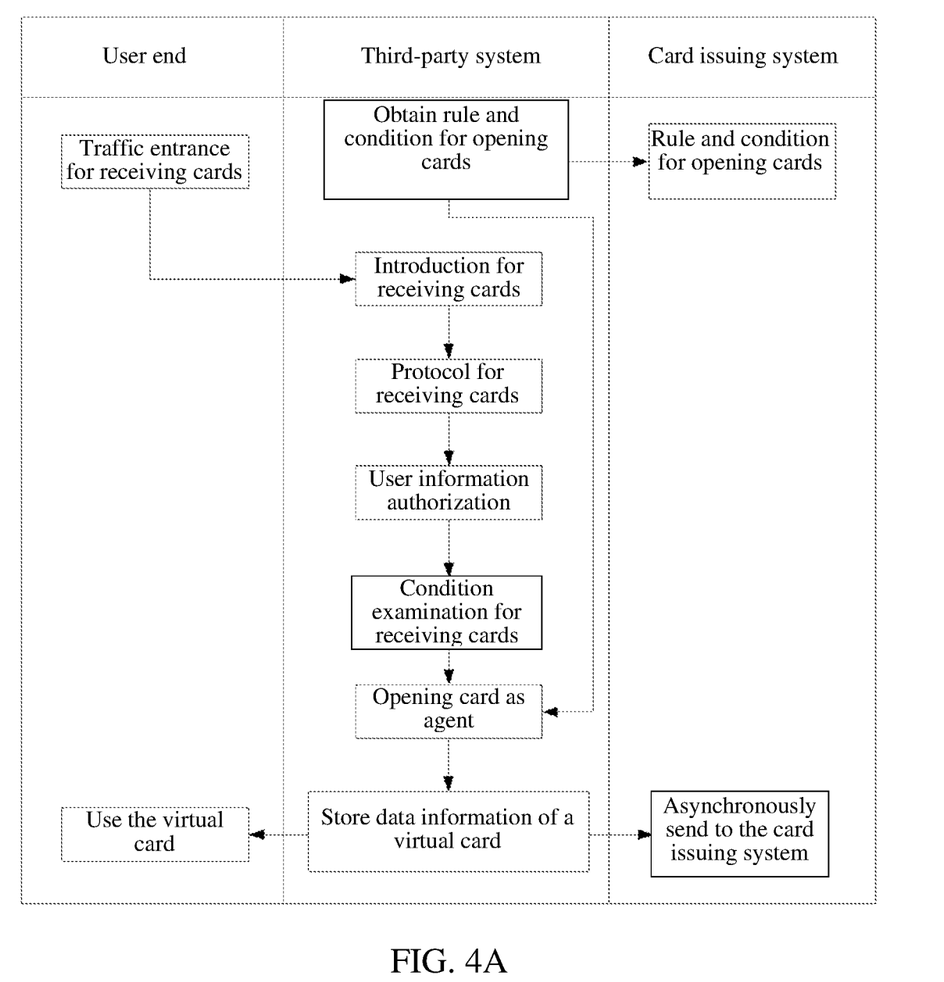
FIG. 4A is a schematic diagram of a virtual card opening method according to an embodiment.
Figure 4B:
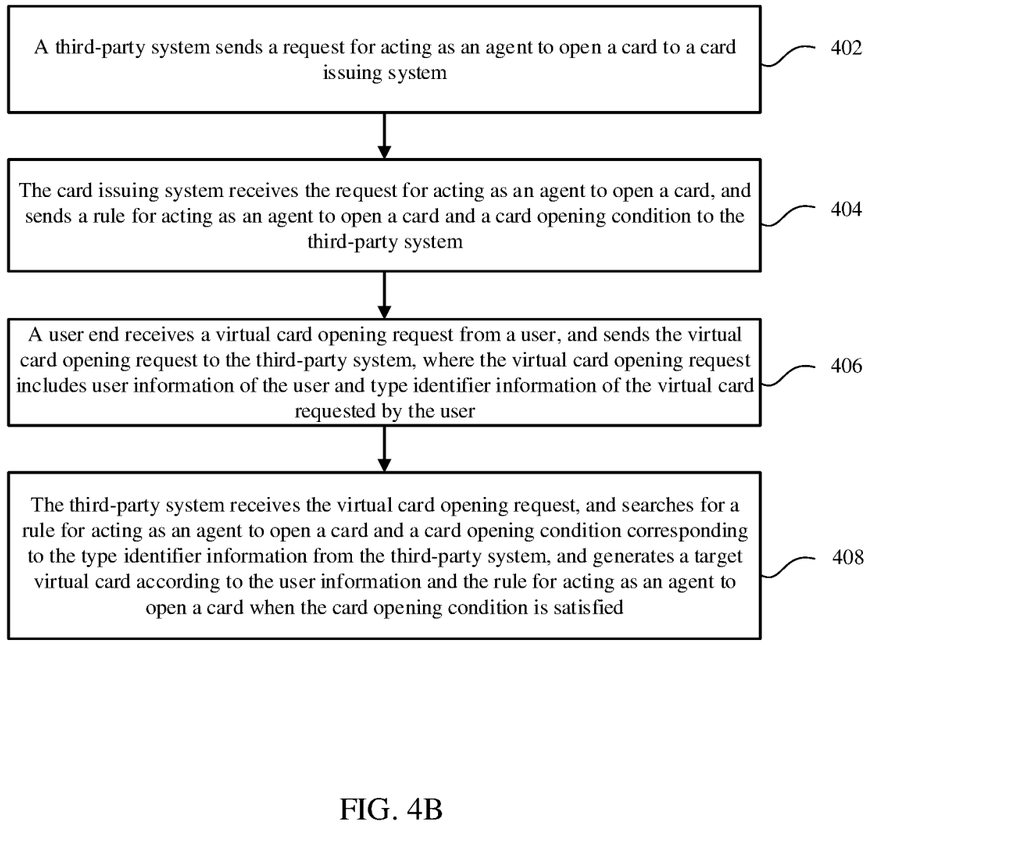
FIG. 4B is flowchart of a virtual card opening method according to an embodiment.

FIG. 4A illustrates a schematic diagram of a virtual card opening method according to an embodiment, and FIG. 4B illustrates a flowchart of the virtual card opening method. The method may be shown as follows:

Step 402: A third-party system sends a request for acting as an agent to open a card to a card issuing system.

The third-party system may be a system other than the card issuing system, for example, a payment system.

Step 404: The card issuing system receives the request for acting as an agent to open a card, and sends a rule for acting as an agent to open a card and a card opening condition to the third-party system.

Step 406: A user end receives a virtual card opening request from a user, and sends the virtual card opening request to the third-party system, where the virtual card opening request includes user information of the user and type identifier information of a virtual card requested by the user.

The user end is a third-party system in a user terminal device.

Step 408: The third-party system receives the virtual card opening request, and searches for a rule for acting as an agent to open a card and a card opening condition corresponding to the type identifier information from the third-party system, and generates a target virtual card according to the user information and the rule for acting as an agent to open a card when the card opening condition is satisfied.

Figure 5:
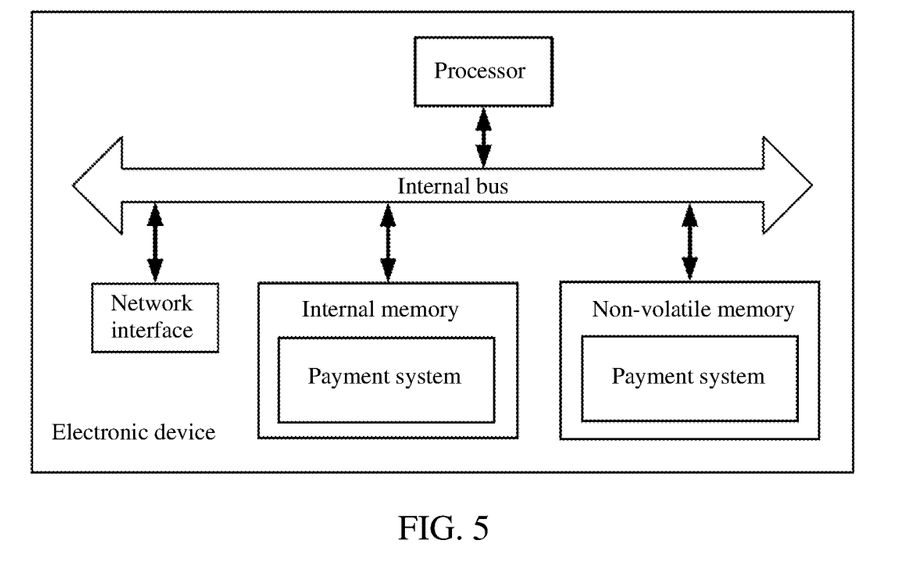
FIG. 5 is a schematic structural diagram of an electronic device according to an embodiment.

FIG. 5 is a schematic structural diagram of an electronic device according to an embodiment. As shown in FIG. 5, on a hardware layer, the electronic device includes a processor, and optionally further includes an internal bus, a network interface, and a memory. The memory may include an internal memory, such as a high-speed random-access memory (RAM), and may further include a non-volatile memory, such as at least one magnetic disk memory. In some embodiments, the electronic device may also include other hardware required by services.

The processor, the network interface, and the memory may be interconnected through an internal bus. The internal bus may be an Industry Standard Architecture (ISA) bus, a Peripheral Component Interconnect (PCI) bus, or an Extended Industry Standard Architecture (EISA) bus, or the like. The bus may be divided into an address bus, a data bus, a control bus, and the like. For ease of description, only one double-headed arrow is used for representing the bus in FIG. 5, but it does not represent that there is only one bus or only one type of bus.

The memory is configured to store a program. The program may include program code. The program code may include computer operation instructions. The memory may include an internal memory and a non-volatile memory, and provide instructions and data for the processor.

The processor reads a corresponding computer program from the non-volatile memory and then runs the computer program, to form a payment system on a logical level. The processor executes the program stored in the memory and is configured to perform the following operations:

receiving a virtual card opening request from a user, the virtual card opening request including user information of the user and type identifier information of a virtual card requested by the user;

searching for a rule for acting as an agent to open a card and a card opening condition corresponding to the type identifier information from the payment system according to the type identifier information, the rule for acting as an agent to open a card and the card opening condition being obtained in advance by the payment system from a card issuing system corresponding to the type identifier information and being stored in the payment system; and generating a target virtual card according to the user information and the rule for acting as an agent to open a card when the card opening condition is satisfied.

The method illustrated in FIG. 2 may be applied to a processor or implemented by a processor. The processor may be an integrated circuit chip and has a signal processing capability. The steps of the foregoing method may be completed by a hardware integrated logical circuit or software instructions in the processor. The processor may be a general-purpose processor, a central processing unit (CPU), a network processor (NP), or the like, and may also be a digital signal processor (DSP), an application-specific integrated circuit (ASIC), a field programmable gate array (FPGA), or another programmable logical device, a discrete gate or a transistor logical device, or a discrete hardware component. The processor may implement or perform methods, steps and logical block diagrams disclosed in the embodiments in this specification. The general-purpose processor may be a microprocessor or the processor may be any conventional processor and the like. Steps of the methods disclosed with reference to the embodiments in this specification may be directly executed by a hardware decoding processor, or may be executed by using a combination of hardware and software modules in the decoding processor. The software modules may be located in a mature storage medium in the field, such as a random-access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor.

The electronic device may further perform the method in FIG. 2 and implement the functions therein. Details are not described again herein.

An embodiment of this application may further provide a computer readable storage medium. The computer readable storage medium may store one or more programs. The one or more programs include instructions. The instructions, when executed by an electronic device including multiple application programs, may cause the electronic device to perform the virtual card opening method in the embodiment shown in FIG. 1 and to be configured to perform the following operations:

receiving a virtual card opening request from a user, the virtual card opening request including user information of the user and type identifier information of a virtual card requested by the user;

searching for a rule for acting as an agent to open a card and a card opening condition corresponding to the type identifier information from the payment system according to the type identifier information, the rule for acting as an agent to open a card and the card opening condition being obtained in advance by the payment system from a card issuing system corresponding to the type identifier information and being stored in the payment system; and generating a target virtual card according to the user information and the rule for acting as an agent to open a card when the card opening condition is satisfied.

Figure 6:
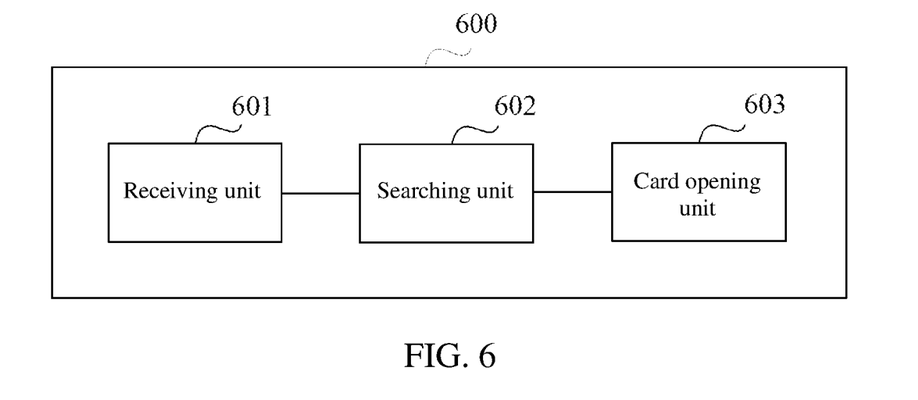
FIG. 6 is a schematic structural diagram of a payment system according to an embodiment.

FIG. 6 is a schematic structural diagram of a payment system according to an embodiment. The payment system 600 includes: a receiving unit 601, a searching unit 602, and a card opening unit 603.

The receiving unit 601 is configured to receive a virtual card opening request from a user, the virtual card opening request including user information of the user and type identifier information of a virtual card requested by the user.

The searching unit 602 is configured to search for a rule for acting as an agent to open a card and a card opening condition corresponding to the type identifier information from the payment system according to the type identifier information, the rule for acting as an agent to open a card and the card opening condition being obtained in advance by the payment system from a card issuing system corresponding to the type identifier information and being stored in the payment system.

The card opening unit 603 is configured to generate a target virtual card according to the user information and the rule for acting as an agent to open a card when the card opening condition is satisfied.

In some embodiments, the payment system 600 further includes a storage unit.

The storage unit is configured to store information of the target virtual card in the payment system.

In some embodiments, the payment system 600 further includes an asynchronous sending unit.

The asynchronous sending unit is configured to asynchronously send the information of the target virtual card stored in the payment system to the card issuing system according to the rule for acting as an agent to open a card.

In some embodiments, that the asynchronous sending unit is configured to asynchronously send the information of the target virtual card stored in the payment system to the card issuing system according to the rule for acting as an agent to open a card includes:

sending the information of the target virtual card stored in the payment system to the card issuing system according to a preset time interval.

In some embodiments, the receiving unit 601 is configured to receive a target virtual card using request from the user; and the asynchronous sending unit is configured to send the information of the target virtual card stored in the payment system to the card issuing system.

In some embodiments, the receiving unit 601 is configured to receive the target virtual card using request from the user through the user end.

In some embodiments, the payment system 600 further includes a recharging unit.

The recharging unit is configured to add credits to the target virtual card.

In the payment system, the receiving unit is configured to receive a virtual card opening request from a user, the virtual card opening request including user information of the user and type identifier information of a virtual card requested by the user; the searching unit is configured to search for a rule for acting as an agent to open a card and a card opening condition corresponding to the type identifier information from the payment system according to the type identifier information, the rule for acting as an agent to open a card and the card opening condition being obtained in advance by the payment system from a card issuing system corresponding to the type identifier information and being stored in the payment system; and the card opening unit is configured to generate a target virtual card according to the user information and the rule for acting as an agent to open a card when the card opening condition is satisfied. Therefore, when the user receives the virtual card in the payment system, real-time interaction between the payment system and the card issuing system is avoided, thus effectively improving virtual card opening efficiency of the user.

Figure 7:
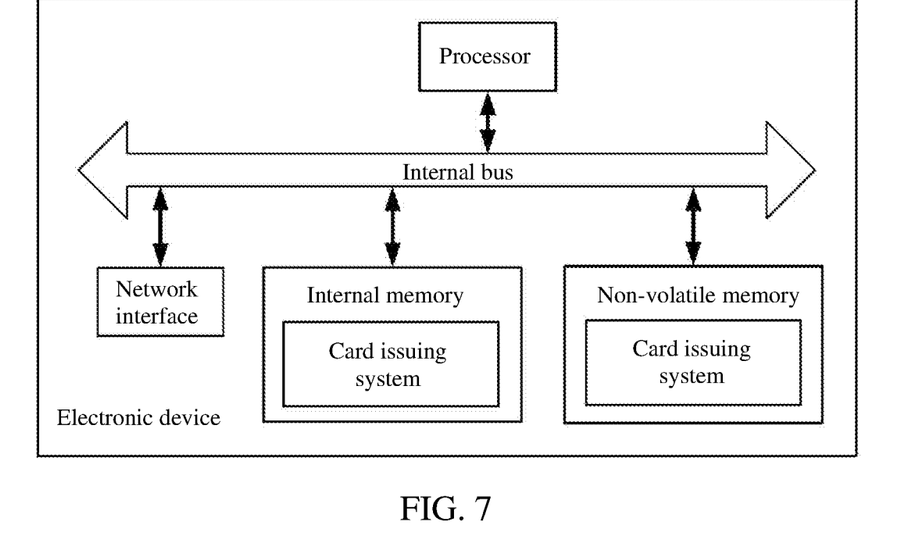
FIG. 7 is a schematic structural diagram of an electronic device according to an embodiment.

FIG. 7 is a schematic structural diagram of an electronic device according to an embodiment. As shown in FIG. 7, on a hardware layer, the electronic device includes a processor, and optionally further includes an internal bus, a network interface, and a memory. The memory may include an internal memory, such as a high-speed random-access memory (RAM), and may further include a non-volatile memory, such as at least one magnetic disk memory. Certainly, the electronic device may also include other hardware required by services.

The processor, the network interface, and the memory may be interconnected through an internal bus. The internal bus may be an Industry Standard Architecture (ISA) bus, a Peripheral Component Interconnect (PCI) bus, or an Extended Industry Standard Architecture (EISA) bus, or the like. The bus may be divided into an address bus, a data bus, a control bus, and the like. For ease of expression, only one double-headed arrow is used for representing the bus in FIG. 7, but it does not represent that there is only one bus or only one type of bus.

The memory is configured to store a program. The program may include program code. The program code includes computer operation instructions. The memory may include an internal memory and a non-volatile memory, and provides instructions and data for the processor.

The processor reads a corresponding computer program from the non-volatile memory and then runs the computer program, to form a card issuing system on a logical level. The processor executes the program stored in the memory and is configured to perform the following operations:

receiving a request for acting as an agent to open a card sent by a payment system; and sending a rule for acting as an agent to open a card and a card opening condition to the payment system, so that the payment system generates a target virtual card according to the rule for acting as an agent to open a card when the card opening condition is satisfied.

The method illustrated in FIG. 3 may be applied to a processor or implemented by a processor. The processor may be an integrated circuit chip and has a signal processing capability. The steps of the foregoing method may be completed by a hardware integrated logical circuit or software instructions in the processor. The processor may be a general-purpose processor, a central processing unit (CPU), a network processor (NP), or the like, and may also be a digital signal processor (DSP), an application-specific integrated circuit (ASIC), a field programmable gate array (FPGA), or another programmable logical device, a discrete gate or a transistor logical device, or a discrete hardware component. The processor may implement or perform methods, steps and logical block diagrams disclosed in the embodiments in this specification. The general-purpose processor may be a microprocessor or the processor may be any conventional processor and the like. Steps of the methods disclosed with reference to the embodiments in this specification may be directly executed by a hardware decoding processor, or may be executed by using a combination of hardware and software modules in the decoding processor. The software modules may be located in a mature storage medium in the field, such as a random-access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor.

The electronic device may further perform the method in FIG. 3 and implement the functions therein. Details are not described again herein.

Some embodiments may further provide a computer readable storage medium. The computer readable storage medium may store one or more programs. The one or more programs may include instructions. The instructions, when executed by an electronic device including multiple application programs, may cause the electronic device to perform the virtual card opening method in the embodiment shown in FIG. 3 and to be configured to perform the following operations:

receiving a request for acting as an agent to open a card sent by a payment system; and sending a rule for acting as an agent to open a card and a card opening condition to the payment system, so that the payment system generates a target virtual card according to the rule for acting as an agent to open a card when the card opening condition is satisfied.

Figure 8:
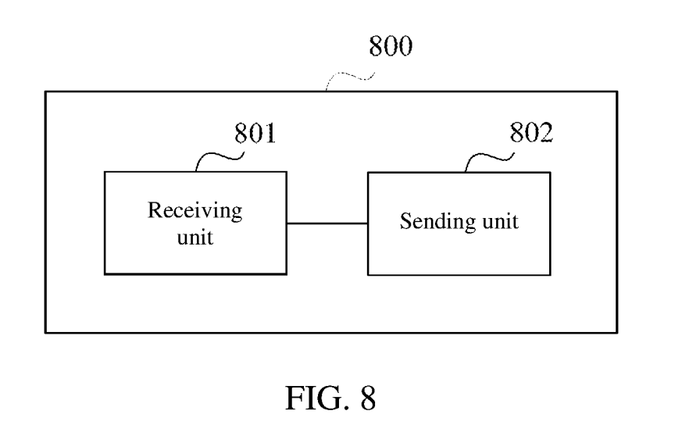
FIG. 8 is a schematic structural diagram of a card issuing system according to an embodiment.

FIG. 8 is a schematic structural diagram of a card issuing system according to an embodiment. The card issuing system 800 includes a receiving unit 801 and a sending unit 802.

The receiving unit 801 is configured to receive a request for acting as an agent to open a card sent by a payment system.

The sending unit 802 is configured to send a rule for acting as an agent to open a card and a card opening condition to the payment system, so that the payment system generates a target virtual card according to the rule for acting as an agent to open a card when the card opening condition is satisfied.

In some embodiments, the receiving unit 801 is configured to receive information of a newly generated target virtual card sent by the payment system.

According to the card issuing system, the receiving unit is configured to receive a request for acting as an agent to open a card sent by a payment system; the sending unit is configured to send a rule for acting as an agent to open a card and a card opening condition to the payment system, so that the payment system generates a target virtual card according to the rule for acting as an agent to open a card when the card opening condition is satisfied. Therefore, virtual card opening is decoupled from the card issuing system under the condition that the user receives the virtual card in time, which effectively reduces the traffic load of the card issuing.

Figure 9:
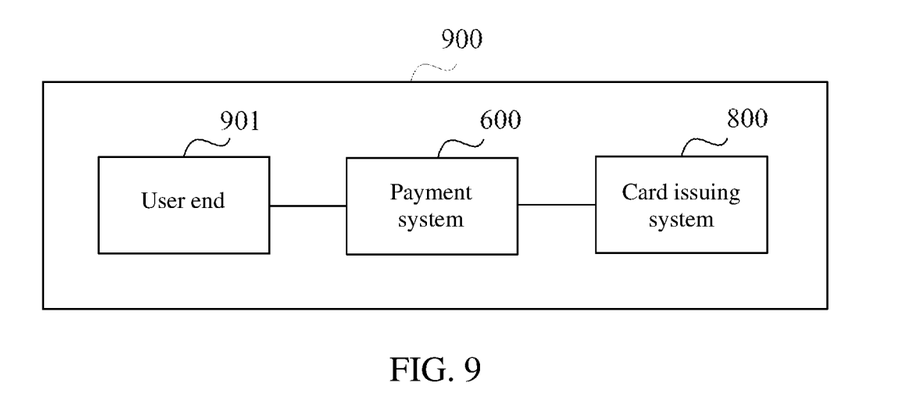
FIG. 9 is a schematic structural diagram of a virtual card opening system according to an embodiment.

FIG. 9 is a schematic structural diagram of a virtual card opening system according to an embodiment. The card opening system 900 includes a user end 901, a payment system 600, and a card issuing system 800.

The payment system 600 is configured to send a request for acting as an agent to open a card to the card issuing system 800.

The card issuing system 800 is configured to receive the request for acting as an agent to open a card, and send a rule for acting as an agent to open a card and a card opening condition to the payment system 600.

The user end 901 is configured to receive a virtual card opening request from a user, and send the virtual card opening request to the payment system 600, the virtual card opening request including user information of the user and type identifier information of a virtual card requested by the user.

The payment system 600 is configured to receive the virtual card opening request, search for a rule for acting as an agent to open a card and a card opening condition corresponding to the type identifier information from the payment system, and generate a target virtual card according to the user information and the rule for acting as an agent to open a card when the card opening condition is satisfied.

In the 1990s, an improvement on a technology can be as achieved by either an improvement on hardware (for example, an improvement on a circuit structure such as a diode, a transistor, or a switch) or an improvement on software (an improvement on a method procedure). However, with the development of technologies, improvements of many method procedures at present can be considered as direct improvements on hardware circuit structures. Almost all designers program the improved method procedures into hardware circuits to obtain corresponding hardware circuit structures. Therefore, it is improper to assume that the improvement of a method procedure cannot be implemented by a hardware module. For example, a programmable logic device (PLD) (such as a field programmable gate array (FPGA)) is such an integrated circuit whose logic functions are determined by devices programmed by a user. Designers perform programming to "integrate" a digital system into a PLD, without the need to ask a chip manufacture to design and manufacture a dedicated integrated circuit chip. Moreover, at present, the programming is mostly implemented by using "logic compiler" software, in replacement of manually manufactured integrated circuit chips. The logic compiler software is similar to a software compiler used for developing and writing a program, and original code before compiling also needs to be written by using a specific programming language, which is referred to as a hardware description language (HDL). There are many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL), among which Very-High-Speed Integrated Circuit Hardware Description Language (VHDL) and Verilog are most commonly used now. It should also be appreciated by a person skilled in the art that a hardware circuit for implementing the logic method procedure may be easily obtained by logically programming the method procedure using the several hardware description languages listed above and programming the method procedure into an integrated circuit.

A controller can be implemented in a suitable manner. For example, the controller may be in the form of a microprocessor or a processor, a computer readable storage medium storing computer readable program code (for example, software or firmware) executed by the (micro)processor, a logic gate, a switch, an application-specific integrated circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. A memory controller can also be implemented as a part of control logic of a memory. It is also appreciated by a person skilled in the art that the controller can be implemented by using pure computer readable program code, and in addition, the method steps can be logically programmed to cause the controller to implement the same function in the form of a logic gate, a switch, an ASIC, a programmable logic controller, and an embedded microcontroller. Therefore, this type of controller can be considered as a hardware component, and apparatuses included in the controller for implementing various functions can also be considered as structures inside the hardware component. Alternatively, the apparatuses used for implementing various functions can even be considered as both software modules for implementing the method and structures inside the hardware component.

The system, apparatus, modules or units illustrated in the foregoing embodiments may be implemented by a computer chip or an entity, or implemented by a product having a specific function. A typical implementation device is a computer. The computer may be a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus is divided into various units based on functions, and the units are described respectively. Functions of the units may be implemented in one or more pieces of software and/or hardware.

A person skilled in the art should understand that the embodiments of the present specification may be provided as a method, a system, or a computer program product. Therefore, the present specification may use a form of a hardware-only embodiment, a software-only embodiment, or an embodiment combining software and hardware aspects. Moreover, the present specification may use a form of a computer program product implemented on one or more computer-usable storage media (including, but not limited to, a disk memory, a CD-ROM, an optical memory, and the like) that include computer-usable program code.

The present specification is described with reference to the flowcharts and/or block diagrams of the method, the device (system), and the computer program product mentioned above. In some embodiments, computer program instructions may be used to implement each process and/or block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a function specified in one or more processes in the flowcharts and/or in one or more blocks in the block diagrams.

The computer program instructions may also be stored in a computer readable memory that can instruct the computer or another programmable data processing device to work in a specific manner, so that the instructions stored in the computer readable memory generate an artifact that includes an instruction apparatus. The instruction apparatus implements a function specified in one or more processes in the flowcharts and/or in one or more blocks in the block diagrams.

The computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a function specified in one or more processes in the flowcharts and/or in one or more blocks in the block diagrams.

In a typical configuration, the computing device includes one or more processors (CPUs), an input/output interface, a network interface, and a memory.

The memory may include forms such as a non-persistent memory, a random-access memory (RAM), and/or a non-volatile memory in a computer readable medium, such as a read-only memory (ROM) or a flash memory (flash RAM). The memory is an example of the computer readable medium.

The computer readable medium includes persistent and non-persistent, removable and non-removable media, which may store information by using any method or technology.

The information may be a computer readable instruction, a data structure, a program module, or other data. The example of the computer storage medium includes, but is not limited to, a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storages, a cassette, a tape, disk storage, or other magnetic storage devices, or any other non-transmission media, which may be configured to store information that may be accessed by a computing device. According to the definitions in this specification, the computer readable medium does not include transitory computer readable media (transitory media), such as a modulated data signal and carrier.

It should be further noted that, the terms "include", "comprise", and any variants thereof herein are intended to cover a non-exclusive inclusion. Therefore, in the context of a process, a method, a commodity, or a device that includes a series of elements, the process, method, commodity or device not only includes such elements, but also includes other elements not specified expressly, or may include elements inherent to the process, method, commodity or device. Without more restrictions, an element limited by "include a/an . . . " does not exclude other same elements existing in the process, method, commodity or device that includes the element.

This application may be described in general context of a computer executable instruction executed by a computer, for example, in a program module. Generally, the program module includes a routine, a program, an object, a component, a data structure, and the like for executing a specific task or implementing a specific abstract data type. This application may also be practiced in distributed computing environments. In the distributed computing environments, the task is executed by a remote processing device connected through a communications network. In the distributed computing environments, the program module may be located in local and remote computer storage media including a storage device.

The embodiments in this specification are described in a progressive manner. For same or similar parts in the embodiments, reference may be made to each other. Each embodiment focuses on a difference from other embodiments. Especially, the system embodiment is basically similar to the method embodiment, and therefore is described briefly; for related parts, reference may be made to partial descriptions in the method embodiment.

The foregoing descriptions are merely preferred embodiments in this specification, but are not intended to limit this application. Any modification, equivalent replacement, or improvement made within the spirit and principle of this application shall fall within the scope of the claims of this application.

What is claimed is:

1. A computer-implemented virtual card opening method, comprising:
    sending, by a computing device of a payment system to each of a plurality of virtual card issuing systems, a request for acting an agent to open a virtual card on behalf of the each virtual card issuing system to reduce traffic load on the each virtual card issuing system;
    obtaining, by the computing device of the payment system from the each virtual card issuing system, a rule for acting as the agent of the each virtual card issuing system and a condition to open a virtual card of the each virtual card issuing system;
    storing, by the computing device of the payment system in a mapping relationship, the obtained rules and the obtained virtual card opening conditions mapped with type identifiers of the virtual cards;
    receiving, by the computing device of the payment system through an online traffic entrance, a virtual card opening request from a user, the virtual card opening request comprising user information of the user and type identifier of a target virtual card;
    redirecting, by the computing device of the payment system, the user from the online traffic entrance to a virtual card receiving page so that opening of the target virtual card is decoupled from the virtual card issuing system issuing the target virtual card;
    searching and identifying, by the computing device of the payment system according to the type identifier of the target virtual card and the mapping relationship, a target virtual card issuing system, the rule for acting as the agent to open the target virtual card on behalf of the target virtual card issuing system, and the virtual card opening condition to open the target virtual card according to actual situations, wherein the virtual card opening condition comprises a protocol for receiving the target virtual card;
    sending, by the computing device of the payment system through the virtual card receiving page, the protocol for receiving the target virtual card for the user to view;
    in response to the user agreeing to the protocol, determining, by the computing device of the payment system, whether the user information in the virtual card opening request satisfies the virtual card opening condition for opening the target virtual card;
    in response to the virtual card opening condition being satisfied, generating, by the computing device of the payment system, the target virtual card according to the user information and the rule for acting as the agent to open the target virtual card; and
    asynchronously sending, by the computing device of the payment system, information of the target virtual card to the identified target virtual card issuing system so that real-time interaction between the payment system and the target virtual card issuing system is avoided.

2. The method according to claim 1, wherein the online traffic entrance comprises a hyperlink.

3. The method according to claim 1, further comprising:
    storing, by the payment system, information of the target virtual card in the payment system.

4. The method according to claim 1, wherein the type identifier of the target virtual card comprises an identifier of the virtual card issuing system issuing the target virtual card, and
    the storing the rules and the virtual card opening conditions by the computing device of the payment system comprises:
    storing the rules and the virtual card opening conditions in a storage medium associated with the computing device, wherein the rules and the virtual card opening conditions are mapped to identifiers of the plurality of virtual card issuing systems.

5. The method according to claim 1, wherein the asynchronously sending, by the computing device of the payment system, the information of the target virtual card to the identified target virtual card issuing system according to the rule for acting as the agent to open the target virtual card comprises:

sending, by the computing device of the payment system, the information of the target virtual card stored in the payment system to the target virtual card issuing system according to a preset time interval.

6. The method according to claim 1, wherein the asynchronously sending, by the computing device of the payment system, the information of the target virtual card to the identified target virtual card issuing system according to the rule for acting as the agent to open the target virtual card further comprises:

sending, by the computing device of the payment system, the information of the target virtual card stored in the payment system to the target virtual card issuing system after the payment system receives a target virtual card using request from the user.

7. The method according to claim 1, wherein the virtual card opening condition further comprises an introduction of the target virtual card, and the method further comprises:

sending, by the computing device of the payment system through the virtual card receiving page, the introduction of the target virtual card for the user to view.

8. The method according to claim 1, further comprising:

adding, by the computing device of the payment system, credits to the target virtual card for the user to use.

9. A payment system for virtual card opening, comprising a processor and a non-transitory computer-readable storage medium storing instructions executable by the processor to cause the payment system to perform operations comprising:

sending, to each of a plurality of virtual card issuing systems, a request for acting an agent to open a virtual card on behalf of the each virtual card issuing system to reduce traffic load on the each virtual card issuing system;

obtaining, from the each virtual card issuing system, a rule for acting as the agent of the each virtual card issuing system and a condition to open a virtual card of the each virtual card issuing system;

storing, in a mapping relationship, the obtained rules and the obtained virtual card opening conditions in a map mapped with type identifiers of the virtual cards;

receiving, through an online traffic entrance, a virtual card opening request from a user, the virtual card opening request comprising user information of the user and type identifier of a target virtual card;

redirecting the user from the online traffic entrance to a virtual card receiving page so that opening of the target virtual card is decoupled from the virtual card issuing system issuing the target virtual card;

searching and identifying, according to the type identifier of the target virtual card and the mapping relationship, a target virtual card issuing system, the rule for acting as the agent to open the target virtual card on behalf of the target virtual card issuing system, and the virtual card opening condition to open the target virtual card, wherein the virtual card opening condition comprises a protocol for receiving the target virtual card according to actual situations, wherein the virtual card opening condition comprises a protocol for receiving the target virtual card;

sending, through the virtual card receiving page, the protocol for receiving the target virtual card for the user to view;

in response to the user agreeing to the protocol, determining whether the user information in the virtual card opening request satisfies the virtual card opening condition for opening the target virtual card;

in response to the virtual card opening condition being satisfied, generating the target virtual card according to the user information and the rule for acting as the agent to open the target virtual card when the virtual card opening condition is satisfied; and     asynchronously sending information of the target virtual card to the identified target virtual card issuing system according to the rule for acting as the agent to open the target virtual card so that real-time interaction between the payment system and the target virtual card issuing system is avoided.

10. The payment system according to claim 9, wherein the online traffic entrance comprises a hyperlink.

11. The payment system according to claim 9, wherein the operations further comprise:

storing information of the target virtual card in the payment system.

12. The payment system according to claim 9, wherein the type identifier of the target virtual card comprises an identifier of the card issuing system issuing the target virtual card, and     the storing the rules and the virtual card opening conditions by the computing device of the payment system comprises:

storing the rules and the virtual card opening conditions in a storage medium associated with the computing device, wherein the rules and the virtual card opening conditions are mapped to identifiers of the plurality of virtual card issuing systems.

13. The payment system according to claim 9, wherein the asynchronously sending the information of the target virtual card to the identified target virtual card issuing system according to the rule for acting as the agent to open the target virtual card comprises:

sending the information of the target virtual card stored in the payment system to the target virtual card issuing system according to a preset time interval.

14. The payment system according to claim 9, wherein the asynchronously sending the information of the target virtual card to the identified target virtual card issuing system according to the rule for acting as the agent to open the target virtual card comprises:

sending the information of the target virtual card stored in the payment system to the target virtual card issuing system after the payment system receives a target virtual card using request from the user.

15. The payment system according to claim 9, wherein the virtual card opening condition further comprises an introduction of the target virtual card, and the operations further comprise:

sending, by the computing device of the payment system through the virtual card receiving page, the introduction of the target virtual card for the user to confirm.

16. The payment system according to claim 9, wherein the operations further comprise:

adding credits to the target virtual card for the user to use.

17. A non-transitory computer-readable storage medium for virtual card opening, configured with instructions executable by one or more processors to cause the one or more processors to perform operations comprising:

sending, to each of a plurality of virtual card issuing systems, a request for acting an agent to open a virtual card on behalf of the each virtual card issuing system to reduce traffic load on the each virtual card issuing system;

obtaining, from the each virtual card issuing system, a rule for acting as the agent of the each virtual card issuing system and a condition to open a virtual card of the each virtual card issuing system;

storing, in a mapping relationship, the obtained rules and the obtained virtual card opening conditions mapped with type identifiers of the virtual cards;

receiving, through an online traffic entrance, a virtual card opening request from a user, the virtual card opening request comprising user information of the user and type identifier of a target virtual card;

redirecting the user from the online traffic entrance to a virtual card receiving page so that opening of the target virtual card is decoupled from the virtual card issuing system issuing the target virtual card;

searching and identifying, according to the type identifier of the target virtual card and the mapping relationship, a target virtual card issuing system, the rule for acting as the agent to open the target virtual card on behalf of the target virtual card issuing system, and the virtual card opening condition to open the target virtual card, wherein the virtual card opening condition comprises a protocol for receiving the target virtual card according to actual situations, wherein the virtual card opening condition comprises a protocol for receiving the target virtual card;

sending, through the virtual card receiving page, the protocol for receiving the target virtual card for the user to view;

in response to the user agreeing to the protocol, determining whether the user information in the virtual card opening request satisfies the virtual card opening condition for opening the target virtual card;

in response to the virtual card opening condition being satisfied, generating the target virtual card according to the user information and the rule for acting as the agent to open the target virtual card when the virtual card opening condition is satisfied; and asynchronously sending information of the target virtual card to the identified target virtual card issuing system according to the rule for acting as the agent to open the target virtual card so that real-time interaction between the payment system and the target virtual card issuing system is avoided.

18. The storage medium according to claim 17, wherein the online traffic entrance comprises a hyperlink.

19. The storage medium according to claim 17, wherein the asynchronously sending the information of the target virtual card to the identified target virtual card issuing system according to the rule for acting as the agent to open the target virtual card comprises:

sending the information of the target virtual card stored in the payment system to the target virtual card issuing system after the payment system receives a target virtual card using request from the user.

20. The storage medium according to claim 17, wherein the asynchronously sending the information of the target virtual card to the identified target virtual card issuing system according to the rule for acting as the agent to open the target virtual card comprises:

sending the information of the target virtual card stored in the payment system to the target virtual card issuing system according to a preset time interval.

\* \* \* \* \*